United States Patent [19]

Teramachi

[11] Patent Number: 5,251,365

[45] Date of Patent: Oct. 12, 1993

[54] METHOD FOR MAKING BALL SCREW NUT

[76] Inventor: Hiroshi Teramachi, 34-8, Higashitamagawa 2-chome, Setagaya-ku, Tokyo, Japan

[21] Appl. No.: 752,917

[22] Filed: Aug. 29, 1991

Related U.S. Application Data

[60] Division of Ser. No. 670,408, Mar. 15, 1991, abandoned, which is a continuation of Ser. No. 948,189, Dec. 31, 1986, abandoned.

[30] Foreign Application Priority Data

Jan. 9, 1986 [JP] Japan ..................... 61-1365

[51] Int. Cl.$^5$ .............................. F16C 33/64
[52] U.S. Cl. ................... 29/898.063; 29/558; 29/898.066; 29/DIG. 19; 51/291; 51/326; 74/424.8 R
[58] Field of Search ..................... 29/898.062, 898.063, 29/898.066, DIG. 19, DIG. 26, 557, 558; 51/289 R, 290, 291, 326, 327, 123 R; 74/424.8 B, 441, 459, 424.8 R, 424.8 NA, 499

[56] References Cited

U.S. PATENT DOCUMENTS

| 2,004,649 | 6/1935 | Booth et al. ................ 51/291 |
| 2,983,560 | 5/1961 | Pitner ................... 29/DIG. 19 X |
| 3,436,973 | 4/1969 | Aweimrine .............. 74/424.8 R |
| 3,824,905 | 7/1974 | Jablonsky ................... 74/499 |
| 4,254,588 | 3/1981 | Onoda et al. ................ 51/291 |
| 4,322,917 | 4/1982 | Ueda ..................... 51/123 R |
| 4,371,360 | 2/1983 | Ojima et al. ............... 74/89.15 |
| 4,459,867 | 7/1984 | Jones .................... 74/89.15 |
| 4,494,025 | 1/1985 | Fickler .................. 74/89.15 |
| 4,542,661 | 9/1985 | Teramachi . |
| 4,557,156 | 12/1985 | Teramachi . |
| 4,614,128 | 9/1986 | Fickler ............... 74/424.8 B |
| 4,693,131 | 9/1987 | Teramachi ............ 74/441 X |
| 4,724,599 | 2/1988 | Corkin ..................... 29/557 |

FOREIGN PATENT DOCUMENTS

| 2735166 | 2/1978 | Fed. Rep. of Germany . |
| 2735167 | 2/1978 | Fed. Rep. of Germany . |
| 58-160665 | 9/1983 | Japan . |
| 59-93557 | 5/1984 | Japan . |
| 59-131059 | 7/1984 | Japan . |
| 60-177838 | 9/1985 | Japan . |
| 60-255336 | 12/1985 | Japan . |
| 60-263765 | 12/1985 | Japan . |
| 592261 | 10/1977 | Switzerland . |
| 1327276 | 8/1973 | United Kingdom . |
| 2128690 | 5/1984 | United Kingdom . |
| 2134221 | 8/1984 | United Kingdom . |
| 2141203 | 12/1984 | United Kingdom . |
| 2160948A | 2/1986 | United Kingdom . |

Primary Examiner—Irene Cuda
Assistant Examiner—S. Thomas Hughes
Attorney, Agent, or Firm—Armstrong, Westerman, Hattori, McLeland & Naughton

[57] ABSTRACT

Herein disclosed is a ball screw nut for constituting a ball screw unit, which can be rotatably borne by angular contact bearings and is formed with a cylindrical extension such that a rotational drive member can be connected to the nut extension, whereby vibrations, which might otherwise result from the error in the rotation transmission and the misalignment, are eliminated to ensure stable and accurate rotations.

1 Claim, 6 Drawing Sheets

```
┌─────────────────────────────┐
│ CLAMPING A CYLINDRICAL PIPE │
│ WITH A CENTERING MEMBER     │
└──────────────┬──────────────┘
               │
┌──────────────┴──────────────┐
│ GRINDING AND FINISHING THE  │
│ OUTER CIRCUMFERENCE OF ONE  │
│ END PORTION OF THE          │
│ CYLINDRICAL PIPE TO FORM    │
│ A MACHINING REFERENCE FACE  │
└──────────────┬──────────────┘
```

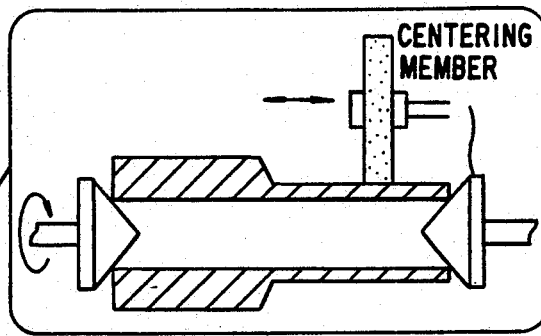

```
┌─────────────────────────────┐
│ GRINDING THE INNER          │
│ CIRCUMFERENCE OF AN         │
│ EXTENSION AT THE ONE END    │
│ OF THE PIPE WITH REFERENCE  │
│ TO THE REFERENCE FACE       │
│ THEREBY FORMING A RECEPTACLE│
└──────────────┬──────────────┘
```

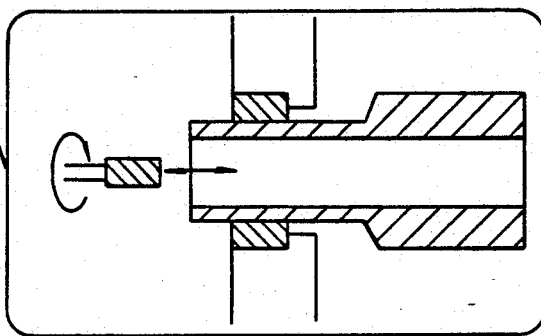

```
┌─────────────────────────────┐
│ GRINDING THE OTHER END      │
│ PORTION OF THE CYLINDRICAL  │
│ PIPE AT ITS INNER           │
│ CIRCUMFERENCE THEREBY       │
│ FORMING BALL ROLLING        │
│ GROOVE THEREIN              │
└──────────────┬──────────────┘
               │
┌──────────────┴──────────────┐
│ FORMING ANGULAR BALL ROLLING│
│ GROOVES AT AN OUTER         │
│ CIRCUMFERENCE OF THE        │
│ CYLINDRICAL PIPE FOR ANGULAR│
│ CONTACT BEARINGS            │
└──────────────┬──────────────┘
```

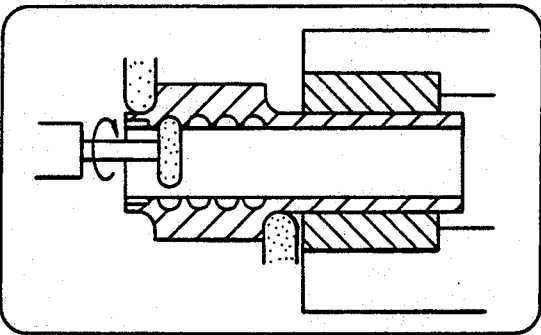

```
┌─────────────────────────────┐
│ ASSEMBLING THE CYLINDRICAL  │
│ BALL SCREW NUT ON THE BALL  │
│ SCREW SHAFT WITH BALLS IN   │
│ THE BALL ROLLING GROOVES    │
│ THERE BETWEEN               │
└──────────────┬──────────────┘
               │
┌──────────────┴──────────────┐
│ CONNECTING A DRIVE MOTOR TO │
│ THE CONNECTION OF THE       │
│ CYLINDRICAL NUT EXTENSION   │
└─────────────────────────────┘
```

Fig.7

METHOD FOR MAKING BALL SCREW NUT

This application is a division of application Ser. No. 670,408 filed Mar. 15, 1991, now abandoned which in turn is a continuation of application Ser. No. 948,189, filed on Dec. 31, 1986, now abandoned.

FIELD OF THE INVENTION AND RELATED ART STATEMENT

The present invention relates to a ball screw nut for use in a ball screw unit and, more particularly, to an improvement in a nut to be screwed on a ball screw shaft through a number of balls.

An example of the ball screw nut of the above-specified type according to the prior art is shown in FIG. 5. A ball screw nut 2 is formed in its inner and outer circumferences, respectively, with a rolling groove 31, through which the nut 2 is screwed on a ball screw shaft 1 through a number of balls 3, and ball rolling grooves 32 on which the nut 2 is borne by a pair of bearing members 4 (e.g., 4a and 4b). The outer circumference of the ball screw nut 2 is further formed at its one end with a joint flange 7 which in turn is formed with a gear 8 for torque transmission. For general use, moreover, the ball screw nut 2 constitutes a ball screw unit together with the ball screw shaft 1, the bearing members 4 and so on. a stationary flange 6 is formed to project from the outer race 5 of one bearing member 4a. In FIG. 5, reference numeral 9 denotes a retaining spacer which is interposed between the paired bearing members 4 of the ball screw unit for retaining each bearing member 4 under pressure on a predetermined portion of the outer circumference of the ball screw nut 2. Numeral 10 denotes a pair of dust seals for plugging the gaps between the two end portions of the ball screw shaft 1 and nut 2.

Ball screw nut 2 thus constructed is rotatably borne by the bearing members 4, and it can rotate relative to the ball screw shaft 1 so that these two can reciprocate relative to each other.

If the ball screw unit described above is used, it is possible to construct a travelling table mechanism which can be fed finely and quickly, as shown in FIG. 6. In this travelling table mechanism, a moving table 12 is movably arranged on a stationary bed 11. The ball screw shaft 1 is rotatably supported near its two ends by bearing members 13 and 14. One end portion 1a of the ball screw shaft 1 is connected through a coupling 15 to the shaft 16a of one drive motor 16. The outer race 5 of the bearing member 4a is fixed on the moving table 12 through the stationary flange 6. There is engaged with the gear 8 and a transmission gear 17 which is fixed on the shaft 18a of another drive motor 18 mounted fixedly on the moving table 12.

If the drive motors 16 and 18 of the travelling table mechanism thus constructed are rotated in opposite directions, the moving table 12 is quickly fed in a predetermined direction. If, on the contrary, the drive motors 16 and 18 are rotated in the same direction but at slightly different numbers of rotations per unit time, the moving table 12 is finely fed in a predetermined direction.

When the ball screw nut 2 of the prior art is to be rotationally driven, the gear 8 at its one side may be brought into meshing engagement with the transmission gear 17 of the drive motor 18. Since, however, the gears 8 and 17 have their axes of rotation misaligned and offset, the rotating accuracy of the ball screw nut 2 will naturally disperse as a result of the play or the like of the gear 8 while the rotating force is being transmitted from the drive motor 18 to the ball screw nut 2. The rotations of this ball screw nut 2 are accordingly liable to become unstable. As a result, the travelling table mechanism shown in FIG. 6 is troubled by a problem that it is difficult to make accurate the feeding accuracy of the moving table 12, thus making it impossible to effect the fine and quick feeds highly accurately.

OBJECT AND SUMMARY OF THE INVENTION

It is, therefore, an object of the present invention to construct the ball screw nut such that the nut and the drive member have their axes of rotations aligned to minimize the error in the rotations transmitted from the drive member to the ball screw nut thereby to enhance the rotating accuracy of the nut.

Another object of the present invention is to adopt the above-specified ball screw nut in a travelling table mechanism thereby to enhance the accuracy of the fine and quick feeds of a member to be moved.

According to the present invention, there is provided a cylindrical ball screw nut to be screwed on a ball screw shaft through a number of balls, characterized: in that a nut body has its two end shoulders formed on their outer circumferences with ball rolling grooves on which the balls of angular contact bearings are allowed to roll along the outer circumferences; and in that said nut body has its one end formed with a cylindrical nut extension which has an external diameter smaller than at least said ball rolling races and an internal diameter larger than the external diameter of said ball screw shaft and to which is connected a rotational drive member for rotating said nut body.

The ball screw nut in the above-specified technical means has to be supported by a frame so that it may be rotationally driven. Therefore, the ball screw nut is supported through the angular contact bearings while considering both the thrust and radial loads to act thereon. And, these angular contact bearings are desirably of the inner race omitted type, in which the ball rolling grooves are formed directly on the outer circumferences of two end shoulders of the nut body by omitting the inner races. Moreover, the extension formed at one end of the nut body has an external diameter smaller than that of the ball rolling grooves so that the angular contact bearings may be fitted thereon. On the other hand, the internal diameter of the extension is made larger than the external diameter of the ball screw shaft which is to be movably screwed in the ball screw nut. Still moreover, the length of the extension may be appropriately changed in design but has to be designed to provide a portion at which the rotational drive member can be connected thereto.

The rotational drive member is this case is not limited to; but may be exemplified by, a well-known motor which is connected to the extension of the ball screw nut by connecting means such as coupling so that it can transmit its rotations through an output shaft projecting from its body. In an alternative of the rotational drive member, the extension itself of the ball screw nut may form the output shaft of the motor. Specifically, the extension is formed in its outer circumference with ball rolling grooves which are appropriately spaced to allow the balls of the paired angular contact bearings to roll. At the same time, a rotor is attached to that extension so that the former may rotate integrally with the latter. Moreover, the extension acting as the output shaft is rotatably attached to the motor housing through the outer races of the angular contact bearings by fitting these bearings in the ball rolling grooves. And, the extension carrying the rotor is induced to rotate by a stator which is attached to the housing. In the case where the motor is used, the ball screw nut itself functions as to the motor shaft so that more stable and accurate rotations can be attained.

As has been described above, the ball screw nut of the present invention is formed with the cylindrical extension at one end of its body so that the rotational drive member can be connected directly to the extension. As a result, the ball screw nut has its axis of rotation aligned with that of the rotational drive member so that the error in the transmission of rotations to the ball screw nut can be substantially eliminated.

On the other hand, the nut body is supported on the frame through the angular contact bearings is formed on its inner and outer circumferences with the ball rolling groove for the ball screw shaft and the ball rolling grooves for the bearings so that ball screw shaft and nut can be accurately coaxial.

In case, therefore, the ball screw nut constitutes a ball screw unit together with the ball screw shaft, the frame and so on such that rotational drive members are connected directly to one end of the ball screw shaft and the extension of the ball screw nut, the vibrations based on both the error in the rotation transmission and the misalignment while the rotational force is being transmitted from the individual rotational drive members to the ball screw shaft and nut. As a result, the rotations of these screw shaft and nut can be made accurate relative to each other. Therefore, in case a travelling mechanism is to be constructed by using the ball screw unit, its travelling member can be fed finely or quickly in high accuracy by adjusting the directions and speeds of rotations of the individual rotational drive members.

BRIEF DESCRIPTION OF THE DRAWINGS

FIG. 7 is a flow chart illustrating the method of the instant invention.

DETAILED DESCRIPTION OF PREFERRED EMBODIMENTS

The present invention will be described in detail in the following in connection with the embodiments therefore with referencew to the accompanying drawings.

Figure 1:
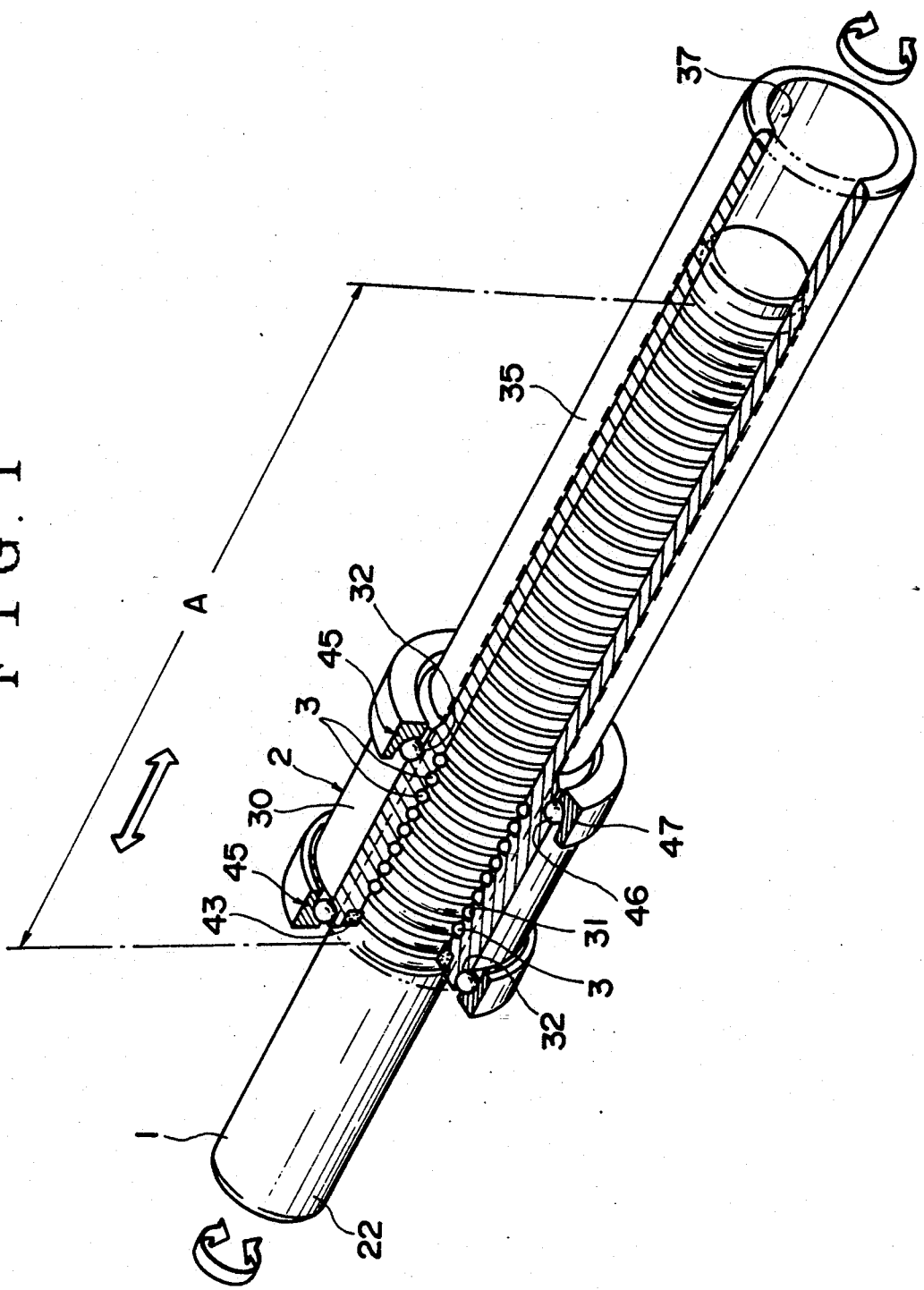
FIG. 1 is a partially broken perspective view showing the state in which a ball screw nut according to one embodiment of the present invention screwed on a ball screw shaft through balls and in which angular contact bearings are fitted on the outer circumference of the ball screw nut.
Figure 2:
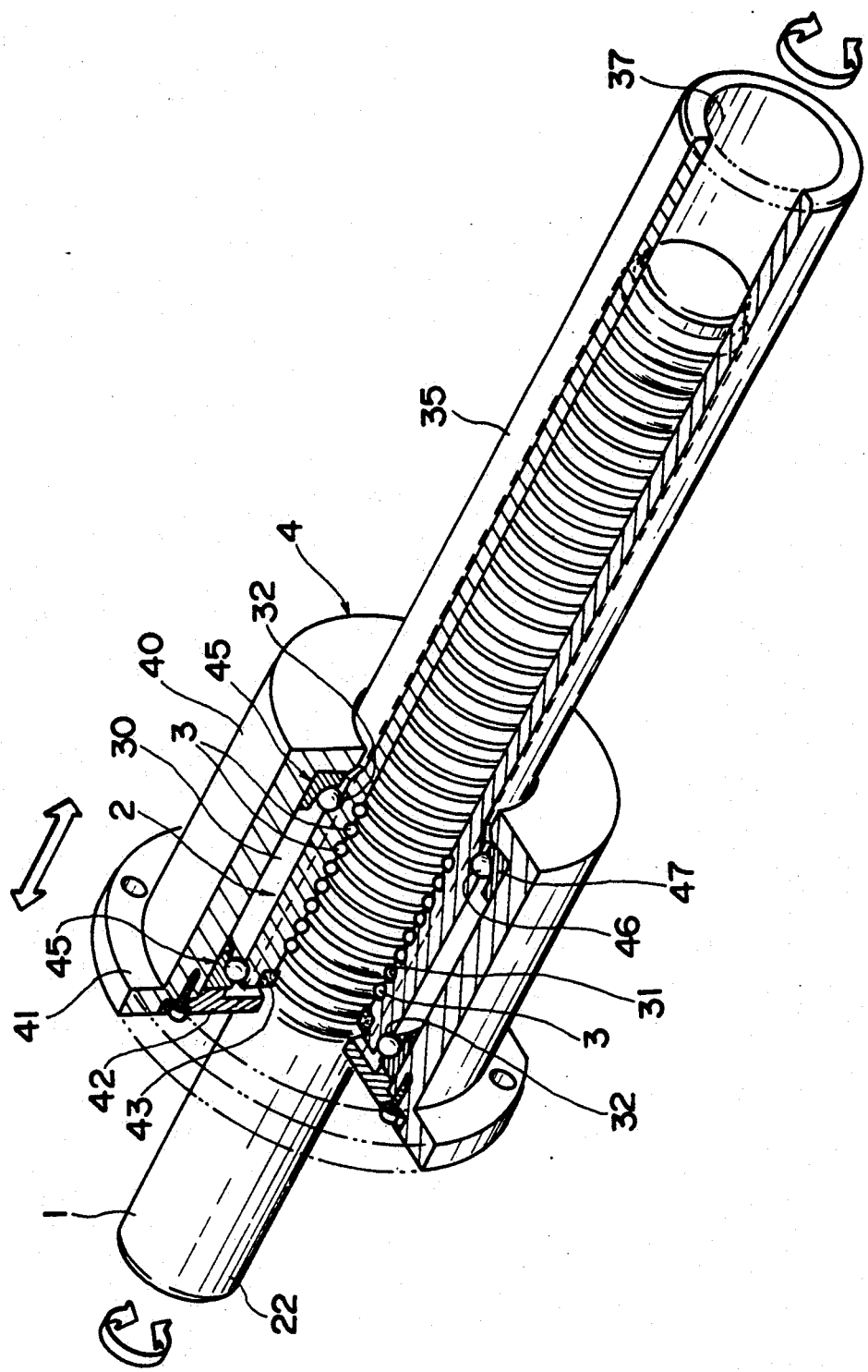
FIG. 2 is a partially broken perspective view showing the state in which the ball screw nut and so on shown in FIG. 1 is assembled in a frame to construct a ball screw unit.
Figure 3:
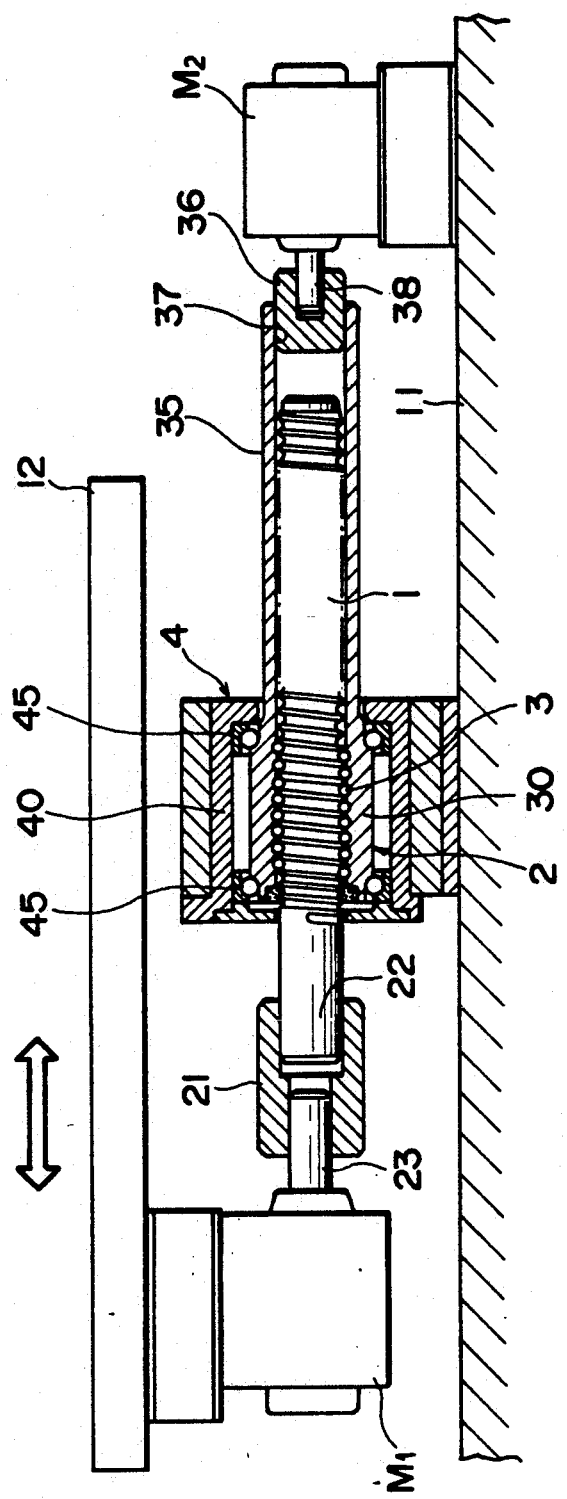
FIG. 3 is an explanatory view showing one example of a travelling table mechanism incorporating the ball screw unit shown in FIG. 2.

In one embodiment shown in FIGS. 1 to 3, a ball screw shaft 1 has a grooved portion A except its two end portions and is formed at its one end portion with a journal 22 which is to be inserted into and retained by a connecting coupling 21 so as to provide a portion to be connected with one drive motor $M_1$ (as shown in FIG. 3).

On the other hand, a ball screw nut 2 to be screwed on the ball screw shaft 1 through a number of balls 3 is constructed of a nut body 30 and an extension 35 which is formed integrally with one end of the nut body 30. This nut body 30 is formed in its inner circumference with appropriate ball rolling groove 31 receiving the balls 3 in a rolling manner and in the two ends of its outer circumference with ball rolling grooves 32 forming part of angular contact bearing 45. Moreover, the extension 35 of the ball screw nut 2 is formed into a cylinder which has an external diameter smaller than the ball rolling grooves 32 for fitting the angular contact bearings 45 on the grooves 32 and an internal diameter larger than the external diameter of the ball screw shaft 1 so that this shaft 1 can move therein. When the end face of the nut body 30 opposed to the extension 35 is positioned at the end of the grooved portion A of the ball screw shaft 1, still moreover, the extension 35 projects from one end portion of the ball screw shaft 1. The extension 35 is formed at the end portion of its inner circumference with a receptacle 37 into which a coupling 36 acting as a member to be connected with another drive motor $M_2$ (as shown in FIG. 3) is inserted and retained. The shaft 38 of the drive motor $M_2$ is fixedly connected to the coupling 36.

A frame 4 is formed of a cylindrical outer sleeve 40 which has its one end opening set to match the external diameter of the aforementioned extension 35. A stationary flange 41 is formed to bulge from the other end of that outer sleeve 40. Between the inner circumference of the outer sleeve 40 and the aforementioned nut body 30, on the other hand, there are sandwitched the angular contact bearings 45, each of which is constructed of: the ball rolling groove 32 formed on the outer circumference of the nut body 30; balls 46 arranged in contact along the ball rolling grooves 32; and an outer race 47 fitted in the inner circumference of the outer sleeve 40 for holding the balls 46 in a rolling manner together with the corresponding ball rolling groove 32. Incidentally, reference numeral 42 appearing in FIG. 2 denotes a retaining plate which is fitted removably in the one end opening of the outer sleeve 40 and assembled in the outer sleeve 40 so as to retain the ball screw nut 2 and the corresponding bearing 45. Numeral 43 denotes a dust seal which is sandwiched between the ball screw shaft 1 and the end portion of the nut body 30 opposed to the extension 35.

As illustrated in FIG. 7 ball screw nut 2 thus constructed is machined by clamping the two ends of a cylindrical pipe by a centering member, grinding and finishing the outer circumference of the one end portion (which corresponds to the extension 35 of the nut 2) of the cylinder to form a machining reference face, and grinding the inner circumference of the extension 35 with reference to the reference face, to form the receptacle 37. Then the other end portion (which corresponds to the body 30 of the ball screw nut 2) of the cylinder is ground at its inner circumference to form the ball rolling groove 31 and simultaneously at its outer circumference to form the ball rolling grooves 32 for the angular contact bearings 45. By adopting these machining procedures, the axis of the receptacle 37 to be formed at the end portion of the extension 35 of the ball screw nut 2 can be accurately aligned with the common axis of the ball rolling groove 31 formed on the inner circumference of the nut body 30 and the ball rolling grooves 32 formed on the outer circumference of the nut body 30.

As a result, the ball screw unit incorporating the ball screw nut 2 thus fabricated may be assembled, by screwing the ball screw nut 2 on the ball screw shaft 1 through the numerous balls 3, fitting the individual angular contact bearings 45 on the paired ball rolling grooves 32 formed on the outer circumference of the nut body 30, inserting them from the extension 35 of the ball screw nut 2 into the opening of the aforementioned outer sleeve 40, and fixing the ball screw nut 2 and the bearings 45 by means of the retaining plate 42.

Next, a travelling table mechanism using the ball screw unit will be taken up as an example so as to explain the operations of that unit. As seen from FIG. 3, a moving table 12 is movably arranged over a stationary bed 11 through a not-shown guide mechanism. One drive motor $M_1$ is fixed on the moving table 12, and the other drive motor $M_2$ is fixed on the stationary bed 11. The frame 4 is fixedly disposed on the stationary bed 11. The journal 22 of the ball screw shaft 1 and the shaft 23 of the drive motor $M_1$ are firmly connected through the coupling 21, and the other coupling 36 is inserted into and retained by the receptacle 37 of the nut 2. Then, the end of the shaft 38 of the other drive motor $M_2$ is firmly connected to the coupling 36.

In the travelling table mechanism thus constructed, in case the moving table 12 is to be finely fed, the drive motors $M_1$ and $M_2$ may have a common direction of rotation and slightly difference numbers of rotation per unit time. Then, the ball screw shaft 1 and nut 2 are rotated by the rotations of the drive motors $M_1$ and $M_2$, respectively, to establish a slight difference in rotations therebetween. The ball screw shaft 1 is finely fed in a predetermined direction in accordance with that difference.

In case the moving table 12 is to be quickly fed, on the other hand, it is sufficient to rotate the individual drive motors $M_1$ and $M_2$ in opposite directions to each other and to set their numbers of rotations per unit time at considerably high values. At this time, the ball screw shaft 1 and nut 2 are rotated in the opposite directions by the drive motors $M_1$ and $M_2$, respectively. As a result, the ball screw shaft 1 is rotated at a high speed corresponding to the sum of the numbers of rotations per unit time of the individual drive motors so that the moving table 12 is fed accordingly quickly.

Next, the performance of the ball screw unit incorporating the ball screw nut according to the present embodiment will be evaluated in the following.

First of all, the journal 22 of the ball screw shaft 1 and the receptacle 37 of the ball screw nut 2 are machined accurately so that the shaft 1 and the nut 2 are connected directly to the shafts 23 and 38 of the drive motors $M_1$ and $M_2$ without any misalignment. As a result, the rotations of the drive motors $M_1$ and $M_2$ are transmitted directly to the ball screw nut 2 while maintaining the rotating accuracies of the shaft 1 and the nut 2 at satisfactory levels.

Secondly, the aforementioned nut body 30 is accurately formed with the ball rolling grooves 31 and 32, by which the ball screw shaft 1 and nut 2 are screwed through the balls 3, and the ball screw nut 2 is supported by the frame 4 through the angular contact bearings 45. As a result, the ball screw shaft 1 and nut 2 are aligned without fail. Thus, the axes of rotations of the shaft 1 and the nut 2 are aligned with those of the drive motors $M_1$ and $M_2$ to obviate the trouble that the ball screw shaft 1 and nut 2 are caused to vibrate by the misalignment while the rotations of the drive motors $M_1$ and $M_2$ are being transmitted to the shaft 1 and the nut 2.

As a result, the relative rotations of the ball screw shaft 1 and nut 2 are made accurate so that the feed of the aforementioned moving table 12 can be highly accurate.

Figure 4:
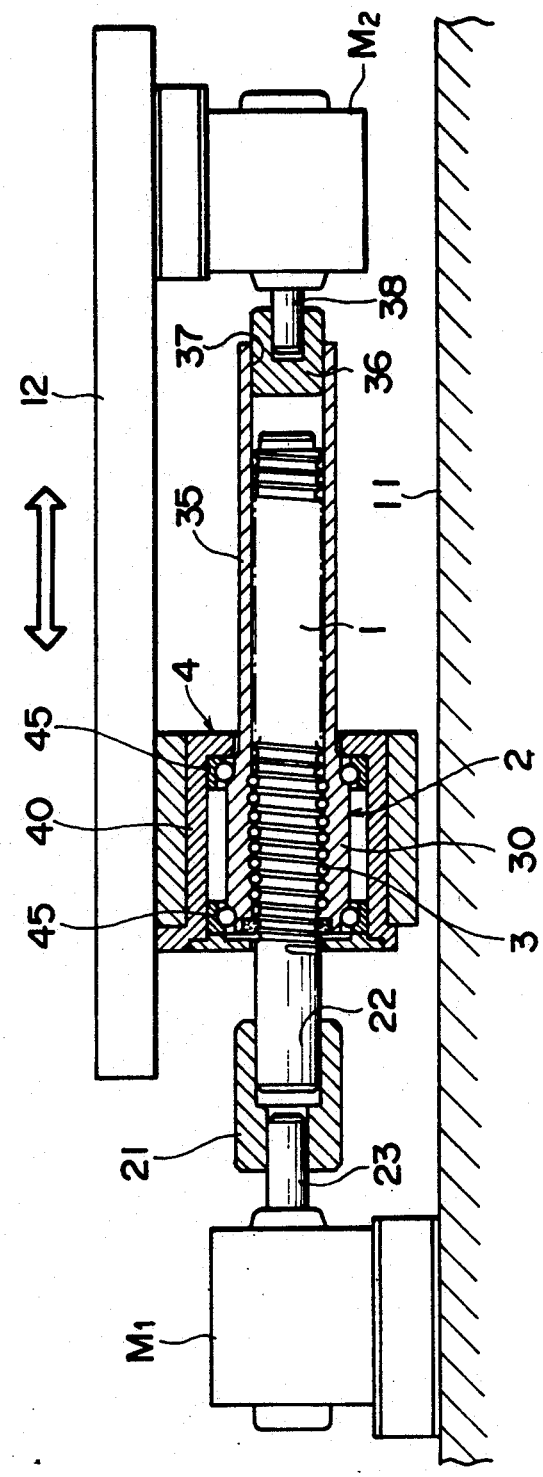
FIG. 4 is an explanatory view showing a modification of the travelling table mechanism shown in FIG. 3.
Figure 5:
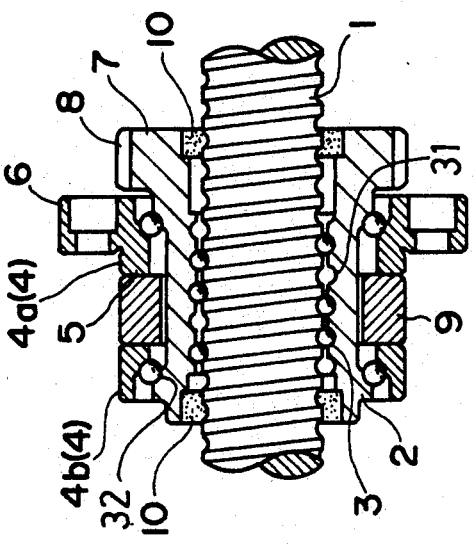
FIG. 5 is an explanatory section showing one example of the ball screw unit incorporating the ball screw nut of the prior art.
Figure 6:
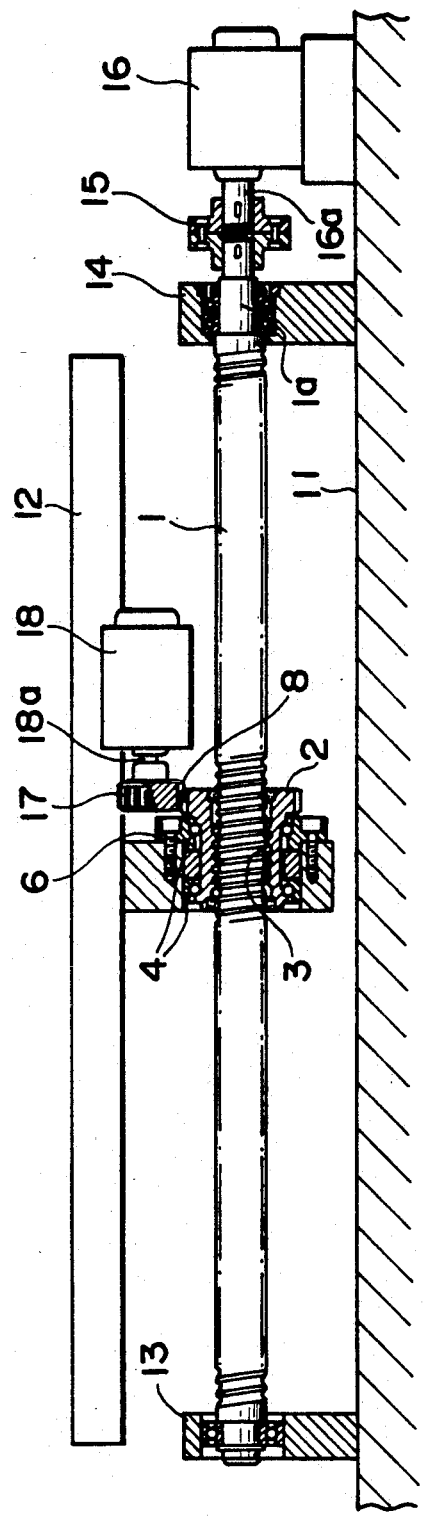
FIG. 6 is an explanatory view showing one example of the travelling table mechanism using the ball screw unit of the prior art.

The construction of the travelling table mechanism should not be limited to that shown in FIG. 3 but may be exemplified by a modification shown in FIG. 4, in which the drive motor $M_1$ to be connected to the ball screw shaft 1 is fixed on the stationary bed 11 whereas the other drive motor $M_2$ to be connected to the ball screw nut 2 is fixed on the moving table 12 and in which the aforementioned frame 4 is fixed on the moving table 12.

What is claimed is:

1. A method for making a ball screw unit having a cylindrical ball screw nut to be supported on a ball screw shaft, said method comprising the steps of:

clamping opposing ends of a cylindrical pipe with a centering member;

grinding and finishing an outer circumference of one end portion of said cylindrical pipe and forming a machining reference face;

grinding an inner circumference of an extension at said one end portion of said pipe with reference to said reference face, thereby forming a receptacle;

grinding an end portion of said cylindrical pipe, opposite said one end portion, at its inner circumference thereby forming ball rolling grooves therein and, simultaneously forming angular ball rolling grooves at an outer circumference of said cylindrical pipe for an angular contact bearing, thereby completing formation of said cylindrical ball screw nut; and assembling said cylindrical ball screw nut, so ground and finished, on said ball screw shaft, with balls in said ball rolling grooves therebetween.

* * * * *